(12) United States Patent
Liu et al.

(10) Patent No.: US 11,383,997 B2
(45) Date of Patent: Jul. 12, 2022

(54) METHOD FOR ECOLOGIC CONFIGURATION OF OIL PRODUCTION HIGH-SALT WASTEWATER ARTIFICIAL WETLAND TO REALIZE UP-TO-STANDARD OPERATION IN WINTER

(71) Applicants: GUDONG PETROLEUM PRODUCTION FACTORY SHENGLI OILFIELD OF SINOPEC, Shandong (CN); DONGYING ZHENGZE ENVIRONMENTAL TECHNOLOGY CO., LTD., Shandong (CN); SHANDONG UNIVERSITY, Shandong (CN)

(72) Inventors: Chunbo Liu, Jinan (CN); Wei Hu, Jinan (CN); Wanguo Hou, Jinan (CN); Xian Zhao, Jinan (CN); Zhaohui Shang, Dongying (CN); Jianbo Ma, Dongying (CN); Yongtao Gu, Dongying (CN); Haifeng He, Dongying (CN); Jingen Yan, Dongying (CN); Zhimin Peng, Dongying (CN); Guodong Meng, Dongying (CN); Xiaohui Xie, Dongying (CN)

(73) Assignees: GUDONG PETROLEUM PRODUCTION FACTORY SHENGLI OILFIELD OF SINOPEC, Dongying (CN); DONGYING ZHENGZE ENVIRONMENTAL TECHNOLOGY CO., LTD., Dongying (CN); SHANDONG UNIVERSITY, Jinan (CN)

( * ) Notice: Subject to any disclaimer, the term of this patent is extended or adjusted under 35 U.S.C. 154(b) by 95 days.

(21) Appl. No.: 16/770,100

(22) PCT Filed: Jul. 5, 2019

(86) PCT No.: PCT/CN2019/094905
§ 371 (c)(1),
(2) Date: Jun. 5, 2020

(87) PCT Pub. No.: WO2020/237780
PCT Pub. Date: Dec. 3, 2020

(65) Prior Publication Data
US 2021/0403355 A1 Dec. 30, 2021

(30) Foreign Application Priority Data
May 31, 2019 (CN) .......................... 201910469603.9

(51) Int. Cl.
*C02F 9/00* (2006.01)
*C02F 1/00* (2006.01)
(Continued)

(52) U.S. Cl.
CPC ............... *C02F 9/00* (2013.01); *C02F 1/001* (2013.01); *C02F 1/24* (2013.01); *C02F 1/5245* (2013.01);
(Continued)

(58) Field of Classification Search
CPC ....................................................... C02F 9/00
See application file for complete search history.

(56) References Cited

U.S. PATENT DOCUMENTS 5,951,866 A 9/1999 Grove et al.

FOREIGN PATENT DOCUMENTS

| CN | 101412564 A | 4/2009 |
| CN | 103351082 A | 10/2013 |

(Continued)

*Primary Examiner* — Peter Keyworth
(74) *Attorney, Agent, or Firm* — Oliff PLC

(57) ABSTRACT

A method for ecologic configuration of an oil production wastewater artificial wetland to realize up-to-standard
(Continued)

operation in winter. When artificial wetland is utilized to treat oil production high-salt wastewater, ecologic configuration of subsurface and surface flow artificial wetland is modified to realize up-to-standard operation in winter. Subsurface flow artificial wetland is composed of soil matrix, water distribution pipe disposed on bottom of soil matrix, wrapped with water-permeable nonwoven cloth and configured to deliver wastewater, and reeds with root systems growing on an inner side of wall of water distribution pipe, stems growing on outer side of wall of water distribution pipe and length being greater than thickness of soil matrix; and surface flow artificial wetland is composed of soil matrix, reeds growing on matrix, water, winter aquatic salt-resistant cold-liking plants, block-stocked fishes, shrimps, crabs, mussels, *Mytilus edulis*, oysters or clams and artificial sand dam.

9 Claims, 1 Drawing Sheet

(51) Int. Cl.
*C02F 1/24* (2006.01)
*C02F 1/52* (2006.01)
*C02F 1/56* (2006.01)
*C02F 1/66* (2006.01)
*C02F 1/72* (2006.01)
*C02F 3/32* (2006.01)
*C02F 103/10* (2006.01)

(52) U.S. Cl.
CPC ............ *C02F 1/56* (2013.01); *C02F 1/66* (2013.01); *C02F 1/72* (2013.01); *C02F 3/327* (2013.01); *C02F 2001/007* (2013.01); *C02F 2103/10* (2013.01); *C02F 2203/006* (2013.01); *C02F 2209/06* (2013.01); *C02F 2209/08* (2013.01); *C02F 2209/10* (2013.01); *C02F 2209/44* (2013.01); *C02F 2301/08* (2013.01)

(56) References Cited

FOREIGN PATENT DOCUMENTS

| | | |
|---|---|---|
| CN | 104291520 A | 1/2015 |
| CN | 204848444 U | 12/2015 |
| CN | 105859041 A | 8/2016 |
| CN | 107381787 A | 11/2017 |
| JP | 2008-68211 A | 3/2008 |
| KR | 10-2007-0033646 A | 3/2007 |
| KR | 100945046 B1 | 3/2010 |

METHOD FOR ECOLOGIC CONFIGURATION OF OIL PRODUCTION HIGH-SALT WASTEWATER ARTIFICIAL WETLAND TO REALIZE UP-TO-STANDARD OPERATION IN WINTER

BACKGROUND

Technical Field

The present invention relates to a method for modifying an oil production wastewater artificial wetland to realize up-to-standard operation under a low-temperature condition in an northern area in winter, in particular to a method for ecologic configuration in modes of combination of different kinds of wetlands, adaptive plant and animal matching on an oil production high-salt waste water artificial wetland to realize up-to-standard operation in winter, and belongs to the technical field of environment protection.

Related Art

The artificial wetland artificially imitates a water purification principle of a natural wetland, utilizes physical, chemical and biological triple coordination effects of media, microorganisms, animals and plants, completes biogeochemical cycle conversion of pollutants through coprecipitation, filtration, adsorption, ion exchange, plant photosynthesis, aquatic animal filter feeding and microbial combined metabolism, and realizes efficient purification of waste water.

The oil production wastewater is wastewater produced in a petroleum exploitation process with main indexes of COD (chemical oxygen demand) lower than or equal to 1000 mg/L, a suspended matter content lower than or equal to 200 mg/L, a petroleum content lower than or equal to 200 mg/L, a polymer content lower than or equal to 100 mg/L and a mineralization degree lower than or equal to 15000 mg/L, and mainly includes oilfield produced water, drilling wastewater and other types of oily wastewater in a combined station. The oilfield produced water refers to water separated from underground produced wet crude after treatment such as dehydration and desalting. Due to differences between stratums and oil production processes, ingredients of the produced water are very complex. Besides crude oil, the wastewater also contains various suspended matters, soluble salts, harmful gas and organic polymers, and the wastewater may pollute water, soil and plants and may destroy natural environment if being directly discharged without treatment.

The artificial wetland as a novel ecological wastewater purification treatment method is easily accepted by the public due to its low cost, low operation cost and landscape effects, and rapidly developed in recent years. Through retrieval, it is found that treatment of the oil production wastewater by the artificial wetland has been practiced at home and abroad for a long time, and a good treatment effect has been achieved. The Chinese patent ZL201310309060.7 discloses a method for deep treatment of oil production wastewater by an artificial wetland with zero-emission, and relates to the method of deeply treating the oil production wastewater by the artificial wetland. However, there are still prominent constraints on popularization of artificial wetlands. First, in the northern area of China, the temperature in winter is low, the physiological activity and propagation speed of the microorganisms are seriously inhibited, in addition, due to plant dormancy, wilting or death, the artificial wetland cannot operate in winter, and the popularization of the artificial wetland is influenced. Although some patents relate to adoption of heat preservation measures such as a greenhouse and plant body coverage and achieve a certain effect, the area of the artificial wetland, especially the surface flow artificial wetland, is generally large, the implementation difficulty is high, the investment is high, the later maintenance operation is complex, and the practicability is not high. Second, a salt content of the oil production wastewater is about 40% to 60% of that of seawater, so that conventional artificial wetland water winter plants cannot normally grow. Third, a subsurface flow artificial wetland is a type widely used in the artificial wetland, and has a good purification effect in winter, but after long-term operation, due to root system and pollutant accumulation, the matrix is easy to block, and needs to be replaced regularly, so that the maintenance cost is high.

Through retrieval, a method of combining the subsurface flow artificial wetland and the surface flow artificial wetland under the condition of low temperature in winter for ecologic configuration of the oil production high-salt wastewater artificial wetland to realize up-to-standard operation in winter has not been reported yet. The method has the following effects: first, the problems that the subsurface flow artificial wetland is easy to block and difficult to recover after long-term operation are solved; second, the surface flow ecological composition is improved, and a salt-tolerant and cold-liking plant *Ulva pertusa* is utilized to solve the problem of lack of plants in winter in the wetland; and meanwhile, different aquatic animals are matched for reinforcing a biological water purification function, and ensuring the water purification effect of the artificial wetland in winter.

SUMMARY

Aiming at the defects in the prior art, the technical problem to be solved by the present invention is to provide a method for ecologic configuration of an oil production high-salt wastewater artificial wetland to realize up-to-standard operation in winter.

The method for ecologic configuration of the oil production high-salt wastewater artificial wetland to realize up-to-standard operation in winter includes the following steps:

(1) performing pretreatment reaction on oil production wastewater through one or a mixture of more than two of NaOH, $Na_2CO_3$, CaO, $Ca(OH)_2$, $NH_3.H_2O$, polyaluminium chloride (PAC) and polyacrylamide (PAM) according to a weight ratio of (5 to 10):1 for 2 to 4 h, then introducing the wastewater into a sedimentation tank or an air floatation tank for treatment for 1 to 10 h, removing sludge, and regulating a pH value of outlet water to 6 to 8 to prepare pretreated outlet water with the water quality of COD being 150 to 300 mg/L, a suspended matter content being 30 to 50 mg/L and a petroleum content being 10 to 20 mg/L;

(2) introducing the pretreated outlet water prepared in the step (1) into an oxidation pond for a hydraulic retention time of 3 to 21 days to prepare oxidation pond outlet water with the water quality of COD being 100 to 150 mg/L, a suspended matter content being 20 to 30 mg/L and a petroleum content being 1 to 10 mg/L; a reflux pump station is disposed at an oxidation pond water outlet, partial oxidation pond outlet water can be refluxed to an oxidation pond water inlet, and a reflux ratio is 20% to 50%;

(3) introducing the oxidation pond outlet water prepared in the step (2) into a subsurface flow artificial wetland for a hydraulic retention time of 0.5 to 2 days to prepare subsurface flow artificial wetland outlet water with the water quality of COD being 60 to 100 mg/L, a suspended matter content being 10 to 20 mg/L and a petroleum content being 1 to 5 mg/L; and (4) introducing the subsurface flow artificial wetland outlet water prepared in the step (3) into a surface flow artificial wetland for a hydraulic retention time of 20 to 30 days at a hydraulic load of at most 0.5 m$^3$/d/m$^2$ to prepare surface flow artificial wetland outlet water with the water quality of COD being 40 to 50 mg/L, a suspended matter content being 10 to 20 mg/L, a petroleum content being 0.01 to 3 mg/L and a mineralization degree being 15000 to 24000 mg/L.

The method is characterized in that:

in the step (3), the subsurface flow artificial wetland is composed of a soil matrix, a water distribution pipe disposed on a bottom of the soil matrix, wrapped with water-permeable nonwoven cloth and configured to deliver the wastewater, and reeds with root systems growing on an inner side of a wall of the water distribution pipe, stems growing on an outer side of the wall of the water distribution pipe and a length being greater than a thickness of the soil matrix, and a structure of the subsurface flow artificial wetland is as shown in FIG. 1. The oxidation pond outlet water prepared in the step (2) only flows through the water distribution pipe, a wastewater purification unit is defined in the water distribution pipe, and a distance from the water distribution pipe to a ground surface is 50 to 100 cm; and in the step (4), the surface flow artificial wetland is composed of a soil matrix, reeds growing on the matrix, water, winter aquatic salt-resistant cold-liking plants, block-stocked fishes, shrimps, crabs, mussels, *Mytilus edulis*, oysters or clams and an artificial sand dam, and a structure of the surface flow artificial wetland is as shown in FIG. 2; the fishes, the shrimps and the crabs are cultured in a mixed-stocked way, and the mussels, the *Mytilus edulis*, the oysters or the clams are cultured in a floating body seedling rope hanging or artificial sand dam stocked way.

According to the method for ecologic configuration of the oil production high-salt wastewater artificial wetland to realize up-to-standard operation in winter, in the step (3), the water distribution pipes have a diameter of 10 to 30 cm, and are laid at intervals of 20 to 60 cm in a reticular shape, A further preferable embodiment is that in the step (3), the water distribution pipes have a diameter of 20 to 30 cm, and are laid at intervals of 30 to 50 cm in a reticular shape.

According to the method for ecologic configuration of the oil production high-salt wastewater artificial wetland to realize up-to-standard operation in winter, in the step (4), the winter aquatic salt-resistant cold-liking plants are preferably *Ulva pertusa* at a planting density of 10 to 40 plants/m$^2$.

According to the method for ecologic configuration of the oil production high-salt wastewater artificial wetland to realize up-to-standard operation in winter, in the step (4), the fishes are preferably trout at a stocking density of 1 to 5 kg/m$^2$.

According to the method for ecologic configuration of the oil production high-salt wastewater artificial wetland to realize up-to-standard operation in winter, in the step (4), the shrimps are preferably exopalaemon *carinicauda* holthuis or *Penaeus vannamei* at a stocking density of 0.1 to 2 kg/m$^2$.

According to the method for ecologic configuration of the oil production high-salt wastewater artificial wetland to realize up-to-standard operation in winter, in the step (4), the crabs are preferably *Eriocheir sinensis* at a stocking density of 0.5 to 1 kg/m$^2$.

According to the method for ecologic configuration of the oil production high-salt wastewater artificial wetland to realize up-to-standard operation in winter, in the step (4), a preferable laying area of the floating body seedling rope hanging or artificial sand dam stocking of the mussels, the *Mytilus edulis*, the oysters or the clams is 10% area stocking rate/mu (mu represents an area of about 666.7 m$^2$).

According to the method for ecologic configuration of the oil production high-salt wastewater artificial wetland to realize up-to-standard operation in winter, in the step (4), a method of laying the artificial sand dam is preferably that a width along a water flow direction is 1 to 5 m, a length is identical to that of the surface flow artificial wetland, a sand surface is laid obliquely, a top end of sand is 5 to 20 cm lower than a water level, a height is 20 to 40 cm, and a particle size of the sand is 20 to 40 meshes.

The method for ecologic configuration of the oil production high-salt wastewater artificial wetland to realize up-to-standard operation in winter disclosed by the present invention achieves the following beneficial effects:

1. By the method of the present invention, the defects in the prior art are overcome, and the up-to-standard operation of the oil production high-salt wastewater artificial wetland in winter is realized.

2. The subsurface flow artificial wetland disclosed in the method of the present invention defines the wastewater purification unit in the water distribution pipe, matrixes such as a gravel layer are not disposed at the outer side of the water distribution pipe, only the soil matrix is disposed for heat insulation, after the water distribution pipe is blocked by the root systems or pollutants, only the water distribution pipe needs to be back flushed, secondary recovery is easy, and replacement or abandon of a great number of matrixes after blockage of a conventional subsurface flow artificial wetland is avoided.

3. The present invention innovatively plants a salt-tolerant and cold-liking marine plant *Ulva pertusa* whose reproductive growth period is in winter and spring and major harvesting period is in late spring and early summer in the oil production high-salt wastewater artificial wetland. Experiments prove that the *Ulva pertusa* can normally grow in the oil production wastewater artificial wetland with a water temperature of 0 to 10° C. and a mineralization degree of 24000 mg/L in winter, the problem of plant lack in the wetland in winter is solved, and the built *Ulva pertusa* artificial wetland provides oxygen gas required for artificial wetland microbial water purification and aquatic animal growth.

4. The preferable trout of the present invention survives at a water temperature of 0 to 5° C. in winter, and dies at a high temperature above 25° C. in summer, so that invasion of alien species cannot be caused.

5. The present invention utilizes mixed-stocking of the fishes, the shrimps, the crabs, the *Mytilus edulis*, the oysters and the clams, an ecological water purification and circulation chain is built, water purification capability of aquatic animals in the artificial wetland is enhanced, an economic chain can be further built, and the aquatic animals in the artificial wetland are utilized to feed economic animals such as minks and foxes to obtain value-added products such as fur, so that economic benefits are improved.

6. For the seedling rope hanging stocking of the *Mytilus edulis* and the oysters according to the present invention, on one hand, the wastewater is purified by using their filter feeding effects, on the other hand, the *Mytilus edulis* and the oysters cultured in the seedling rope hanging stocked way can be used as great-surface-area artificial aquatic plants to which a great number of water purification microorganisms are attached, so that a water purification contact area between the microorganisms and the wastewater is increased.

7. The artificial sand dam of the present invention is disposed at a tail end of each treatment unit, the wastewater is effectively purified, and meanwhile, the sand can be used as a sand filtering system to improve the water quality through further filtration.

DETAILED DESCRIPTION

Figure 1:
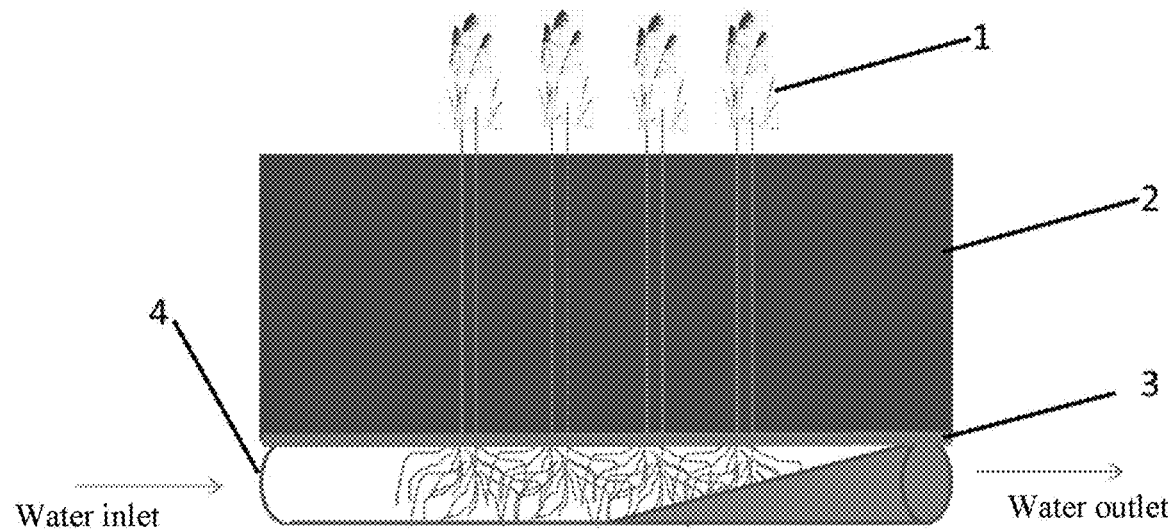
FIG. 1 is a schematic structure diagram of a subsurface flow artificial wetland according to the present invention, in which 1, reed; 2, soil matrix; 3, soil-retaining water-permeable nonwoven cloth; and 4, water distribution pipe.

The contents of the present invention will now be illustrated in detail with reference to concrete embodiments. The following examples are merely preferred implementations of the present invention and are not intended to limit the present invention in any form, and all simple modifications, equivalent variations and modifications made according to the technical spirit of the present invention are within the scope of the technical solution of the present invention.

Embodiment 1

The oil production wastewater utilized in the present embodiment was oil production wastewater obtained after oil-water separation in a combined station of an oil production plant in Shengli Oilfield, Dongying City and had following main indexes: COD=300 mg/L, a suspended matter content=100 mg/L, a petroleum content=50 mg/L, a polymer content=40 mg/L, and mineralization degree=12000 mg/L. The daily sewage treatment capacity is 3000 m$^3$/d.

A method for ecologic configuration of an oil production high-salt wastewater artificial wetland to realize up-to-standard operation in winter according to the present invention was performed according to following steps:

(1) NaOH and Ca(OH)$_2$ mixed according to an equal weight ratio were added into the above oil production wastewater according to a weight ratio of 5:1; reaction was performed for 2.5 h; then, the oil production wastewater was introduced into a sedimentation tank for sedimentation for 15 h; and after a pH value of outlet water of the sedimentation tank was regulated to 6 to 8, pretreated outlet water with the water quality of COD being 150 mg/L, a suspended matter content being 50 mg/L and a petroleum content being 10 mg/L was prepared.

(2) The pretreated outlet water prepared in the step (1) was introduced into an oxidation pond for a hydraulic retention time of 20 days to prepare oxidation pond outlet water with the water quality of COD being 100 mg/L, a suspended matter content being 30 mg/L and a petroleum content being 1 mg/L, and the area of the oxidation pond was 67500 m$^2$ according to a pollutant load of 40 kg COD/(10$^4$ m$^2$·d).

A reflux pump station is disposed at an oxidation pond water outlet. The oil production wastewater generally had a high temperature (40 to 60° C.) and poor biodegradability, and was difficult for microorganisms to survive. Partial oxidation pond outlet water was refluxed to an oxidation pond water inlet at a reflux ratio of 50%; the temperature of the oxidation pond inlet water was regulated, the water quality of inlet water was improved, the quantity of degradation microorganisms was increased, and an oxygen gas concentration of the inlet water was improved. Meanwhile, plant humus (such as reeds, *Suaeda glauca* bunge and *Tamarix chinensis* branches) carried or artificially added in the reflux water could be used as a carbon source available to the microorganisms. An inlet water BOD$_5$/COD$_{Cr}$ ratio was improved, nutrition conditions of biological treatment were optimized, and an addition range was 0.3 kg/m$^2$.

(3) The oxidation pond outlet water prepared in the step (2) was introduced into a subsurface flow artificial wetland for a hydraulic retention time of 2 days to prepare subsurface flow artificial wetland outlet water with the water quality of COD being 60 mg/L, a suspended matter content being 20 mg/L and a petroleum content being 5 mg/L;

the subsurface flow artificial wetland was composed of a soil matrix, a water distribution pipe disposed on a bottom of the soil matrix, wrapped with water-permeable nonwoven cloth and configured to deliver the wastewater, and reeds with root systems growing on an inner side of a wall of the water distribution pipe, stems growing on an outer sides of the wall of the water distribution pipe and a length being greater than a thickness of the soil matrix, and a structure of the subsurface flow artificial wetland is as shown in FIG. 1; the oxidation pond outlet water prepared in the step (2) only flowed through the water distribution pipe, wastewater purification unit is defined in the water distribution pipe, and a distance from the water distribution pipe to a ground surface was 60 to 80 cm; the water distribution pipes had a diameter of 25 cm, and were laid at intervals of 30 to 40 cm in a reticular shape.

Figure 2:
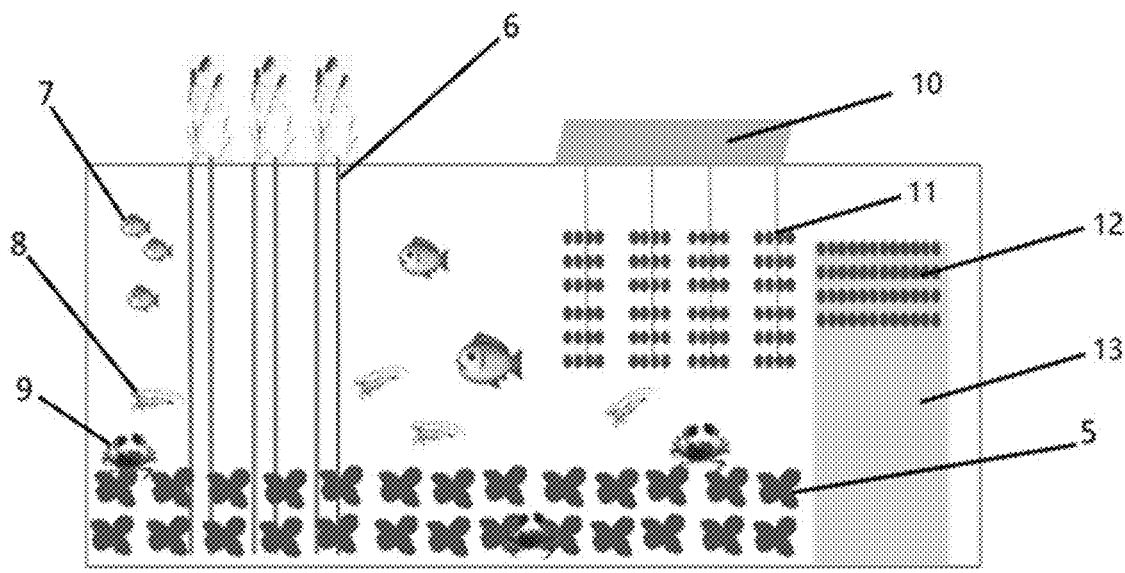
FIG. 2 is a schematic structure diagram and winter operation state demonstration of a surface flow artificial wetland according to the present invention, in which 5, *Ulva pertusa*; 6, hollow reed stalk; 7, trout; 8, shrimp; 9, *Eriocheir sinensis*; 10, floating body; 11, *Mytilus edulis* and oyster; 12, clam; and 13, artificial sand dam.

(4) The subsurface flow artificial wetland outlet water prepared in the step (3) was introduced into a surface flow artificial wetland, the surface flow artificial wetland was composed of a soil matrix, reeds growing on the matrix, water, winter aquatic salt-resistant cold-liking plants, block-stocked fishes, shrimps, crabs, *Mytilus edulis*, oysters or clams and an artificial sand dam, and a structure of the surface flow artificial wetland is as shown in FIG. 2; a planting intensity of *Ulva pertusa* in the surface flow artificial wetland was 25 plants/m$^2$, stocking was performed at a stocking intensity of trout of 1 kg/m$^2$, a stocking intensity of exopalaemon *carinicauda* holthuis of 0.5 kg/m$^2$, a stocking intensity of *Eriocheir sinensis* of 0.5 kg/m$^2$, and the mussels and the *Mytilus edulis* were hung on seedling ropes according to a 10% area stocking rate of per mu water surface. The artificial sand dam was disposed at 50 m from a water outlet of the surface flow artificial wetland, was laid by 30-mesh sand, and had a width being 4 m and a length being 150 m, a sand surface was laid obliquely, the top end of the sand was 15 cm lower than the water level, and the height was 30 cm. A hydraulic retention time was 20 days, and a hydraulic load is 0.3 m$^3$/d/m$^2$, the surface flow artificial wetland outlet water with the water quality of COD being 40 mg/L, a suspended matter content being 10 mg/L, a petroleum content being 0.5 mg/L and a mineralization degree being 20000 mg/L was prepared, and an environment protection standard for operation of the oil production high-salt wastewater artificial wetland in winter was reached.

The trout and exopalaemon *carinicauda* holthuis stocked in the surface flow artificial wetland might be utilized to feed minks, mink meat was utilized to feed foxes, fox meat was utilized to feed alligators, alligator meat might be utilized to feed fishes, minks and foxes, and economical benefits were obtained through preparing mink fur, alligator skin and fox fur.

A circulation chain is that artificial

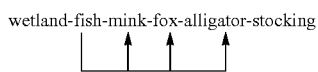
wetland-fish-mink-fox-alligator-stocking wastewater-artificial wetland.

It should be stated that the fishes stocked in the wetland had risk of threatening human health, and for the sake of safety, did not enter the market as aquatic products and only served as feed for animals; and economic benefits could be obtained by preparing fur of the minks, the foxes, the alligators and the like. The water after animals were stocked might be used for water supplementation to composite wetlands, excrement of the animals was utilized for methane tank fermentation, thus providing green fuel for daily life of field workers, and waste residues after fermentation might be utilized as organic fertilizers of wetland plants such as reeds.

Embodiment 2

A method for ecologic configuration of an oil production high-salt wastewater artificial wetland to realize up-to-standard operation in winter was performed according to following steps:

(1) oil production wastewater was subjected to pretreatment reaction for 4 hours by NaOH according to a weight of 10:1, then, the oil production wastewater was introduced into a sedimentation tank or an air floatation tank for treatment for 10 hours, sludge was removed, a pH value of outlet water of the sedimentation tank was regulated to 6 to 8, and pretreated outlet water with the water quality of COD being 200 mg/L, a suspended matter content being 35 mg/L and a petroleum content being 15 mg/L was prepared;

(2) the pretreated outlet water prepared in the step (1) was introduced into an oxidation pond for a hydraulic retention time of 11 days to prepare oxidation pond outlet water with the water quality of COD being 120 mg/L, a suspended matter content being 25 mg/L and a petroleum content being 6 mg/L; a reflux pump station was disposed at an oxidation pond water outlet, and partial oxidation pond outlet water could be refluxed to an oxidation pond water inlet at a reflux ratio of 30%;

(3) the oxidation pond outlet water prepared in the step (2) was introduced into a subsurface flow artificial wetland for a hydraulic retention time of 1.5 days to prepare subsurface flow artificial wetland outlet water with the water quality of COD being 80 mg/L, a suspended matter content being 15 mg/L and a petroleum content being 3 mg/L; and (4) the subsurface flow artificial wetland outlet water prepared in the step (3) was introduced into a surface flow artificial wetland for a hydraulic retention time of 26 days at a hydraulic load of at most 0.5 $m^3/d/m^2$ to prepare surface flow artificial wetland outlet water with the water quality of COD being 40 mg/L, a suspended matter content being 10 mg/L, a petroleum content being 1.5 mg/L and a mineralization degree being 17000 mg/L;

where in the step (3), the subsurface flow artificial wetland was composed of a soil matrix, a water distribution pipe disposed on a bottom of the soil matrix, wrapped with water-permeable nonwoven cloth and configured to deliver the wastewater, and reeds with root systems growing on an inner side of a wall of the water distribution pipe, stems growing on outer side of the wall of the water distribution pipe and a length being greater than a thickness of the soil matrix, and a structure of the subsurface flow artificial wetland is as shown in FIG. 1; the oxidation pond outlet water prepared in the step (2) only flowed through the water distribution pipe, wastewater purification unit is defined in the water distribution pipe, and a distance from the water distribution pipe to a ground surface was 70 cm; and in the step (4), the surface flow artificial wetland was composed of a soil matrix, reeds growing on the matrix, water, winter aquatic salt-resistant cold-liking plants, block-stocked fishes, shrimps, crabs, mussels, *Mytilus edulis*, oysters or clams and an artificial sand dam, and a structure of the surface flow artificial wetland is as shown in FIG. 2; the fishes, the shrimps and the crabs were cultured in a mixed-stocked way, and the mussels, the *Mytilus edulis*, the oysters or the clams were cultured in a floating body seedling rope hanging or artificial sand dam stocked way.

According to the method for ecologic configuration of the oil production high-salt wastewater artificial wetland to realize up-to-standard operation in winter, in the step (3), the water distribution pipes had a diameter of 30 cm, and were laid at intervals of 50 cm in a reticular shape.

According to the method for ecologic configuration of the oil production high-salt wastewater artificial wetland to realize up-to-standard operation in winter, in the step (4), the winter aquatic salt-resistant cold-liking plants were preferably *Ulva pertusa* at a planting density of 40 plants/$m^2$.

According to the method for ecologic configuration of the oil production high-salt wastewater artificial wetland to realize up-to-standard operation in winter, in the step (4), the fishes were preferably trout at a stocking density of 3 kg/$m^2$.

According to the method for ecologic configuration of the oil production high-salt wastewater artificial wetland to realize up-to-standard operation in winter, in the step (4), the shrimps were preferably exopalaemon *carinicauda* holthuis or *Penaeus vannamei* at a stocking density of 1 kg/$m^2$.

According to the method for ecologic configuration of the oil production high-salt wastewater artificial wetland to realize up-to-standard operation in winter, in the step (4), the crabs were preferably *Eriocheir sinensis* at a stocking density of 0.7 kg/$m^2$.

According to the method for ecologic configuration of the oil production high-salt wastewater artificial wetland to realize up-to-standard operation in winter, in the step (4), a preferable density of the floating body seedling rope hanging or artificial sand dam stocking of the mussels, the *Mytilus edulis*, the oysters or the clams was 10% area stocking rate/mu.

According to the method for ecologic configuration of the oil production high-salt wastewater artificial wetland to realize up-to-standard operation in winter, in the step (4), a method of laying the artificial sand dam was preferably that a width along a waterflow direction was 4 m, a length was identical to that of the surface flow artificial wetland, a sand surface was laid obliquely, a top end of sand was 10 cm lower than a water level, a height was 30 cm, and a particle size of the sand was 25 meshes.

Embodiment 3

A method for ecologic configuration of an oil production high-salt wastewater artificial wetland to realize up-to-standard operation in winter according to the present invention was performed according to following steps:

(1) NaOH, CaO and Ca(OH)$_2$ mixed according to an equal weight ratio were added into oil production wastewater according to a weight ratio of 8:1; reaction was performed for 2 hours; then, the oil production wastewater was introduced into a sedimentation tank for sedimentation for 5 hours, and after a pH value of outlet water of the sedimentation tank was regulated to 6 to 8, pretreated outlet water with the water quality of COD being 180 mg/L, a suspended matter content being 40 mg/L and a petroleum content being 20 mg/L was prepared;

(2) the pretreated outlet water prepared in the step (1) was introduced into an oxidation pond for a hydraulic retention time of 7 days to prepare oxidation pond outlet water with the water quality of COD being 100 mg/L, a suspended matter content being 20 mg/L and a petroleum content being 7 mg/L, a reflux pump station was disposed at an oxidation pond water outlet, and partial oxidation pond outlet water could be refluxed to an oxidation pond water inlet at a reflux ratio of 20% to 50%;

(3) the oxidation pond outlet water prepared in the step (2) was introduced into a subsurface flow artificial wetland for a hydraulic retention time of 1 day to prepare subsurface flow artificial wetland outlet water with the water quality of COD being 60 mg/L, a suspended matter content being 10 mg/L, a petroleum content being 2 mg/L; and (4) the subsurface flow artificial wetland outlet water prepared in the step (3) was introduced into a surface flow artificial wetland for a hydraulic retention time of 20 days at a hydraulic load of at most 0.5 m$^3$/d/m$^2$ to prepare surface flow artificial wetland outlet water with the water quality of COD being 40 mg/L, a suspended matter content being 10 mg/L, a petroleum content being 0.5 mg/L and a mineralization degree being 20000 mg/L, where in the step (3), the subsurface flow artificial wetland was composed of a soil matrix, a water distribution pipe disposed a bottom of the soil matrix, wrapped with water-permeable nonwoven cloth and configured to deliver the wastewater, and reeds with root systems growing on an inner side of a wall of the water distribution pipe, stems growing on an outer side of the wall of the water distribution pipe and a length greater than a thickness of the soil matrix, and a structure of the subsurface flow artificial wetland is as shown in FIG. 1; the oxidation pond outlet water prepared in the step (2) only flowed through the water distribution pipe, wastewater purification unit is limited in the water distribution pipe, and a distance from the water distribution pipe to a ground surface was 100 cm; and in the step (4), the surface flow artificial wetland was composed of a soil matrix, reeds growing on the matrix, water, winter aquatic salt-resistant cold-liking plants, block-stocked fishes, shrimps, crabs, mussels, *Mytilus edulis*, oysters or clams and an artificial sand dam, and a structure of the surface flow artificial wetland is as shown in FIG. 2; the fishes, the shrimps and the crabs were cultured in a mixed-stocked way, and the mussels, the *Mytilus edulis*, the oysters or the clams were cultured in a floating body seedling rope hanging or artificial sand dam stocked way.

According to the method for ecologic configuration of the oil production high-salt wastewater artificial wetland to realize up-to-standard operation in winter, in the step (3), the water distribution pipes had a diameter of 30 cm, and were laid at intervals of 60 cm in a reticular shape.

According to the method for ecologic configuration of the oil production high-salt wastewater artificial wetland to realize up-to-standard operation in winter, in the step (4), the winter aquatic salt-resistant cold-liking plants were preferably *Ulva pertusa* at a planting density of 40 plants/m$^2$.

According to the method for ecologic configuration of the oil production high-salt wastewater artificial wetland to realize up-to-standard operation in winter, in the step (4), the fishes were preferably trout at a stocking density of 5 kg/m$^2$.

According to the method for ecologic configuration of the oil production high-salt wastewater artificial wetland to realize up-to-standard operation in winter, in the step (4), the shrimps were preferably exopalaemon *carinicauda* holthuis or *Penaeus vannamei* at a stocking density of 2 kg/m$^2$.

According to the method for ecologic configuration of the oil production high-salt wastewater artificial wetland to realize up-to-standard operation in winter, in the step (4), the crabs were preferably *Eriocheir sinensis* at a stocking density of 1 kg/m$^2$.

According to the method for ecologic configuration of the oil production high-salt wastewater artificial wetland to realize up-to-standard operation in winter, in the step (4), a preferable density of the floating body seedling rope hanging or artificial sand dam stocking of the mussels, the *Mytilus edulis*, the oysters or the clams was 10% area stocking rate/mu.

According to the method for ecologic configuration of the oil production high-salt wastewater artificial wetland to realize up-to-standard operation in winter, in the step (4), a method of laying the artificial sand dam was preferably that a width along a waterflow direction was 3 m, a length was identical to that of the surface flow artificial wetland, a sand surface was laid obliquely, a top end of sand was 10 cm lower than a water level, a height was 20 cm, and a particle size of the sand was 20 meshes.

What is claimed is:

1. A method for ecologically configuring an artificial wetland for treating a high-salt wastewater from oil production to realize an up-to-standard operation in winter, the method comprising:
    (1) performing pretreatment reaction on wastewater from oil production with at least one selected from the group consisting of NaOH, Na$_2$CO$_3$, CaO, Ca(OH)$_2$, NH$_3$.H$_2$O, polyaluminium chloride (PAC) and polyacrylamide (PAM) at a weight ratio of (5 to 10):1 for 2 to 4 hours, then introducing the wastewater into a sedimentation tank or an air floatation tank for treatment for 1 to 10 hours, removing sludge from the wastewater, and regulating a pH value of outlet water to be in a range of 6 to 8 to prepare pretreated outlet water with a water quality of chemical oxygen demand (COD) being in a range from 150 to 300 mg/L, a suspended matter content being in a range from 30 to 50 mg/L, and a petroleum content being in a range from 10 to 20 mg/L;
    (2) introducing the pretreated outlet water into an oxidation pond for a hydraulic retention time of from 3 to 21 days to prepare oxidation pond outlet water with a water quality of COD being in a range from 100 to 150 mg/L, a suspended matter content being in a range from 20 to 30 mg/L and a petroleum content being in a range from 1 to 10 mg/L; wherein a reflux pump station is disposed at an oxidation pond water outlet, and partial oxidation pond outlet water can be refluxed to an oxidation pond water inlet at a reflux ratio of from 20% to 50%;
    (3) introducing the oxidation pond outlet water prepared in the step (2) into a subsurface flow artificial wetland for a hydraulic retention time of from 0.5 to 2 days to prepare subsurface flow artificial wetland outlet water with thea water quality of COD being in a range from 60 to 100 mg/L, a suspended matter content being in a range from 10 to 20 mg/L, and a petroleum content being in a range from 1 to 5 mg/L; and (4) introducing the subsurface flow artificial wetland outlet water prepared in the step (3) into a surface flow artificial wetland for a hydraulic retention time of from 20 to 30 days at a hydraulic load of at most 0.5 m³/d/m² to prepare surface flow artificial wetland outlet water with a water quality of COD being in a range from 40 to 50 mg/L, a suspended matter content being from 10 to 20 mg/L, a petroleum content being in a range from 0.01 to 3 mg/L, and a mineralization degree being in a range from 15000 to 24000 mg/L;

wherein in the step (3), the subsurface flow artificial wetland is composed of a soil matrix, a water distribution pipe disposed on a bottom of the soil matrix, which is wrapped with water-permeable nonwoven cloth and configured to deliver the wastewater, reeds with root systems growing on an inner side of a wall of the water distribution pipe, and stems growing on an outer side of the wall of the water distribution pipe and the water distribution pipe has a length greater than a thickness of the soil matrix, wherein the oxidation pond outlet water prepared in the step (2) only flows through the water distribution pipe, a wastewater purification unit is defined in the water distribution pipe, and a distance from the water distribution pipe to a ground surface is in a range from 50 to 100 cm; and in the step (4), the surface flow artificial wetland is composed of a soil matrix, reeds growing on the soil matrix, water, winter aquatic salt-resistant cold-liking plants, block-stocked fishes, shrimps, crabs, mussels, mytilus edulis, oysters or clams and an artificial sand dam, wherein the block-stocked fishes, the shrimps and the crabs are cultured in a mixed-stocked way, and the mussels, the mytilus edulis, the oysters or the clams are cultured in a floating body seedling rope hanging or artificial sand dam stocked way.

2. The method according to claim 1, wherein in the step (3), the water distribution pipes have a diameter in a range of 10 to 30 cm, and are laid at intervals in a range of 20 to 60 cm in a reticular shape.

3. The method according to claim 2, wherein in the step (3), the water distribution pipes have a diameter in a range of 20 to 30 cm, and are laid at intervals in a range of 30 to 50 cm in a reticular shape.

4. The method according to claim 1, wherein in the step (4), the winter aquatic salt-resistant cold-liking plants are ulva pertusa at a planting density in a range of 10 to 40 plants/m².

5. The method according to claim 1, wherein in the step (4), the block-stocked fishes are trout at a stocking density in a range of 1 to 5 kg/m².

6. The method according to claim 1, wherein in the step (4), the shrimps are exopalaemon caricicauda holthuis or penaeus vannamei at a stocking density in a range of 0.1 to 2 kg/m².

7. The method according to claim 1, wherein in the step (4), the crabs are eriocheir sinensis at a stocking density in a range of 0.5 to 1 kg/m².

8. The method winter according to claim 1, wherein in the step (4), a laying area of the floating body seedling rope hanging or artificial sand dam for stocking the mussels, the mytilus edulis, the oysters or the clams is 10% of the area per mu.

9. The method according to claim 1, wherein in the step (4), the artificial sand dam is laid such that a width along a waterflow direction is in a range from 1 to 5 m, a length is identical to a length of the surface flow artificial wetland, a sand surface is laid obliquely, a top end of sand is in a range from 5 to 20 cm lower than a water level, a height is in a range from 20 to 40 cm, and a particle size of the sand is in a range from 20 to 40 meshes.

\* \* \* \* \*